(12) United States Patent
Kadam et al.

(10) Patent No.: US 12,020,002 B2
(45) Date of Patent: *Jun. 25, 2024

(54) LIBRARY UPGRADE METHOD, APPARATUS, AND SYSTEM

(71) Applicant: DevFactory Innovation FZ-LLC, Dubai Media (AE)

(72) Inventors: Aditya T. Kadam, Pune (IN); Swapnil S. Mahajan, Jalgaon (IN)

(73) Assignee: DevFactory FZ-LLC, Dubai Media (AE)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,967

(22) Filed: Mar. 14, 2022

(65) Prior Publication Data
US 2022/0413809 A1 Dec. 29, 2022

Related U.S. Application Data

(63) Continuation of application No. 16/863,320, filed on Apr. 30, 2020, now Pat. No. 11,294,643, which is a
(Continued)

(51) Int. Cl.
*G06F 9/44* (2018.01)
*G06F 8/30* (2018.01)
(Continued)

(52) U.S. Cl.
CPC .............. *G06F 8/30* (2013.01); *G06F 8/36* (2013.01); *G06F 8/41* (2013.01); *G06F 8/65* (2013.01);
(Continued)

(58) Field of Classification Search
CPC ..... G06F 8/30; G06F 8/36; G06F 8/41; G06F 8/65; G06F 8/71; G06F 8/72;
(Continued)

(56) References Cited

U.S. PATENT DOCUMENTS 8,893,077 B1 * 11/2014 Aiuto ................... G06F 8/36
717/106
9,904,527 B1 * 2/2018 Miller .................. G06F 8/71
(Continued)

OTHER PUBLICATIONS

Notice of Allowance dated Dec. 1, 2021, filed in U.S. Appl. No. 16/863,320 pp. 1-4.
(Continued)

*Primary Examiner* — Thuy Dao
(74) *Attorney, Agent, or Firm* — Terrile, Cannatti & Chambers, LLP

(57) ABSTRACT

A method and apparatus are disclosed for upgrading libraries in a source code program by evaluating libraries in the source code program for predetermined selection criteria specifying library performance limitations to identify at least a first library which does not meet the plurality of predetermined selection criteria and then identifying a first alternative library that is suitable for substitution for the first library so that the source code program may be automatically modified to replace the first library with the first alternative library, thereby generating a modified source code program having an upgraded library functionality.

17 Claims, 4 Drawing Sheets

Related U.S. Application Data continuation of application No. 15/701,727, filed on Sep. 12, 2017, now Pat. No. 10,678,513.

(51) Int. Cl.

| | |
|---|---|
| *G06F 8/36* | (2018.01) |
| *G06F 8/41* | (2018.01) |
| *G06F 8/65* | (2018.01) |
| *G06F 8/71* | (2018.01) |
| *G06F 8/72* | (2018.01) |
| *G06F 9/445* | (2018.01) |
| *G06F 9/455* | (2018.01) |
| *G06F 11/36* | (2006.01) |
| *G06F 21/10* | (2013.01) |
| *G06F 21/57* | (2013.01) |
| *H04L 67/06* | (2022.01) |
| *G06Q 50/18* | (2012.01) |

(52) U.S. Cl.
CPC .................. *G06F 8/71* (2013.01); *G06F 8/72* (2013.01); *G06F 9/44521* (2013.01); *G06F 11/3688* (2013.01); *G06F 21/105* (2013.01); *G06F 21/577* (2013.01); *G06F 21/1073* (2023.08); *G06F 2221/033* (2013.01); *G06Q 50/184* (2013.01)

(58) Field of Classification Search
CPC ............. G06F 9/44521; G06F 11/3688; G06F 21/105; G06F 21/577; G06F 21/1073; G06F 2221/033; G06Q 50/184
See application file for complete search history.

(56) References Cited

U.S. PATENT DOCUMENTS

| | | | |
|---|---|---|---|
| 2012/0167042 A1* | 6/2012 | Tillmann | G06F 8/33 717/113 |
| 2012/0204160 A1* | 8/2012 | Ben-Artzi | G06F 8/51 717/137 |
| 2012/0222024 A1* | 8/2012 | Das | G06F 9/44521 717/170 |
| 2015/0040112 A1* | 2/2015 | Valencia | G06F 8/65 717/168 |
| 2015/0102836 A1* | 4/2015 | Song | G06F 8/34 326/38 |
| 2017/0255544 A1* | 9/2017 | Plate | G06F 21/577 |
| 2017/0277562 A1* | 9/2017 | Christian | G06F 8/457 |

OTHER PUBLICATIONS

Terminal Disclaimer Filed on Oct. 25, 2021, filed in U.S. Appl. No. 16/863,320 pp. 1-2.
Terminal Disclaimer Approved on Oct. 25, 2021, filed in U.S. Appl. No. 16/863,320 p. 1.
Response to Final Office Action dated Oct. 25, 2021, filed in U.S. Appl. No. 16/863,320 pp. 1-8.
Final Rejection dated Jun. 25, 2021, filed in U.S. Appl. No. 16/863,320 pp. 1-7.
Response to Non-Final Office Action dated May 24, 2021, filed in U.S. Appl. No. 16/863,320 pp. 1-13.
Non-Final Rejection dated Dec. 22, 2020, filed in U.S. Appl. No. 16/863,320 pp. 1-20.

* cited by examiner

FIG. 3

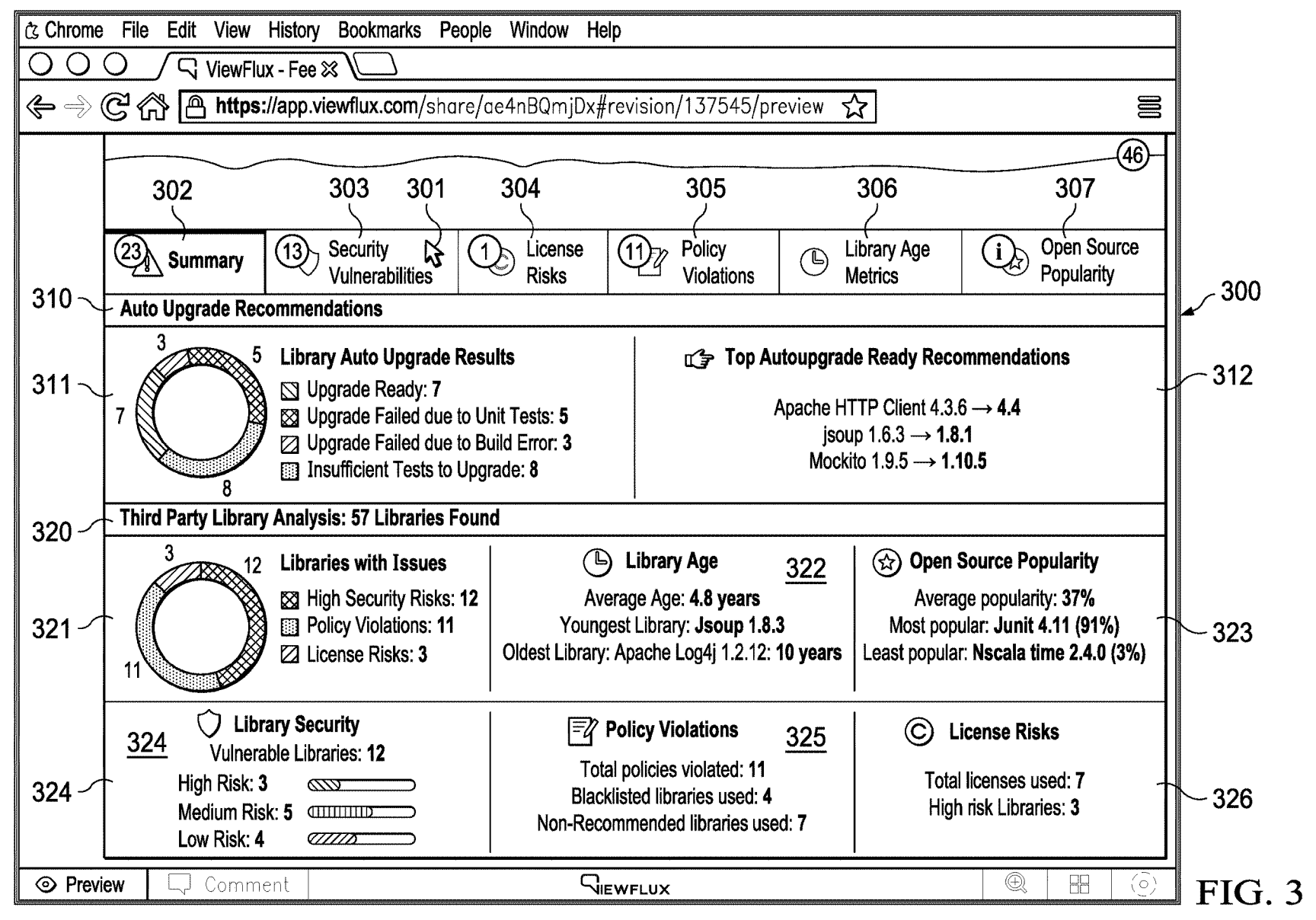

Auto Upgrade Recommendations

Library Auto Upgrade Results
- Upgrade Ready: 7
- Upgrade Failed due to Unit Tests: 5
- Upgrade Failed due to Build Error: 3
- Insufficient Tests to Upgrade: 8

👆 Top Autoupgrade Ready Recommendations
Apache HTTP Client 4.3.6 → 4.4
Jsoup 1.6.3 → 1.8.1
Mockito 1.9.5 → 1.10.5

Third Party Library Analysis: 57 Libraries Found

Libraries with Issues
- High Security Risks: 12
- Policy Violations: 11
- License Risks: 3

🕐 Library Age 322
Average Age: 4.8 years
Youngest Library: Jsoup 1.8.3
Oldest Library: Apache Log4j 1.2.12: 10 years

⭐ Open Source Popularity 323
Average popularity: 37%
Most popular: Junit 4.11 (91%)
Least popular: Nscala time 2.4.0 (3%)

Library Security
Vulnerable Libraries: 12
- High Risk: 3
- Medium Risk: 5
- Low Risk: 4

📝 Policy Violations 325
Total policies violated: 11
Blacklisted libraries used: 4
Non-Recommended libraries used: 7

© License Risks 326
Total licenses used: 7
High risk Libraries: 3

Tabs: Summary | (13) Security Vulnerabilities | (1) License Risks | (11) Policy Violations | Library Age Metrics | (46) Open Source Popularity

LIBRARY UPGRADE METHOD, APPARATUS, AND SYSTEM

BACKGROUND OF THE INVENTION

Field of the Invention

The present invention is directed in general to field of information processing. In one aspect, the present invention relates generally to a software program development tool, method, and apparatus in a data processing system.

Description of the Related Art

Computer programmers, developers, coders and/or software engineers write, test, debug, and maintain computer software or code instructions, called computer programs, which computers must follow to perform their functions. When writing or making changes to computer program to address new or unique technical challenges, programmers often create new, original and unique programming source code which can, unfortunately, suffer from performance limitations and other sub-optimalities. For example, a programmer's unique source code may include a number of undetected software bugs or otherwise suffer from low quality or robustness if the code has not been thoroughly tested, or may have reduced performance functionality if the code is outdated or has not been updated or maintained. Programmers can address many of these problems by using libraries of basic code that can be modified or customized for a specific application, thereby yielding more reliable and consistent programs and increasing the programmer's productivity. However, there are significant difficulties with using libraries in that a significant amount of effort, knowledge, and experience is needed in order to correctly identify a suitable library from among thousands of stored library files, to understand the performance and coding requirements of the library, and to make any required code adjustments thereto. In addition, there are risks and/or other limitations associated with using libraries, especially when a library that is incorporated into source code is outdated or has not been updated or maintained, rendering the library vulnerable to security issues, license issues, compliance policies, and the like. While there are existing tools for identifying source code and library issues (e.g., Black Duck, Sonatype Nexus, Gemnasium, LicenseFinder, and OWASP Dependency Check), such tools typically identify a particular type of security issue as a list of library or source code files, but the developer is required to manually make corrections to the original source code. In addition, when such tools identify or flag a large number of library/source code files as containing vulnerability issues, the identified results can be non-actionable and/or include numerous false positives, making it difficult to track, update, and enforce library usage. As seen from the foregoing, the existing solutions for promoting library usage are extremely difficult at a practical level by virtue of the difficulty in accurately and efficiently identifying and upgrading source code libraries.

SUMMARY OF THE INVENTION

A system, apparatus, and methodology are described for efficiently improving code reuse and improving codebase maintainability by automating the actionable identification of one or more libraries having specified performance limitations (such as security vulnerabilities, license constraints, compliance policy issues, or the like) and also automating the generation of a suggestion and/or upgrade to one or more alternative libraries which resolve one or more of the specified performance limitations. Rather than making manual adjustments to address problematic libraries identified in the source code, selected embodiments of the present disclosure automatically apply specified library issue identification rules to identify one or more problematic libraries having specified performance limitations. Using the identified list of problematic libraries, one or more suitable library alternatives are automatically identified for each identified problematic library, such as by assessing a repository, directory, or database of all Java libraries to retrieve and/or recommend a current or updated library version that resolves one or more of the specified performance limitations associated with a problematic library. In addition, the source code may be automatically modified to use the retrieved/recommended library alternative in place of an identified problematic library. Selected embodiments of the disclosed system, apparatus, and methodology use machine learning, natural language processing (NLP), and/or artificial intelligence (AI) in combination with static and/or dynamic code analysis techniques to automatically analyze libraries included in a source code file against performance limitation criteria and a database of suitable library replacements to yield library substitution opportunities which are used to modify the source code file. For example, selected embodiments of the present disclosure may automatically modify the source code file by finding the locations for all API calls of a problematic library, running a test suite on the source code to get coverage data, evaluating the number of API calls covered by at least one test case against a threshold, automatically changing the source code to incorporate the library alternative if a coverage threshold is not met, and then compiling and building a modified source code using the incorporated library alternative.

The objects, advantages and other novel features of the present invention will be apparent from the following detailed description when read in conjunction with the appended claims and attached drawings.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 3 illustrates an example screen shot of a user interface for a library alternative upgrade recommendation engine that automatically identifies and generates library alternative upgrade recommendations in accordance selected embodiments of the present disclosure.

DETAILED DESCRIPTION

Figure 1:
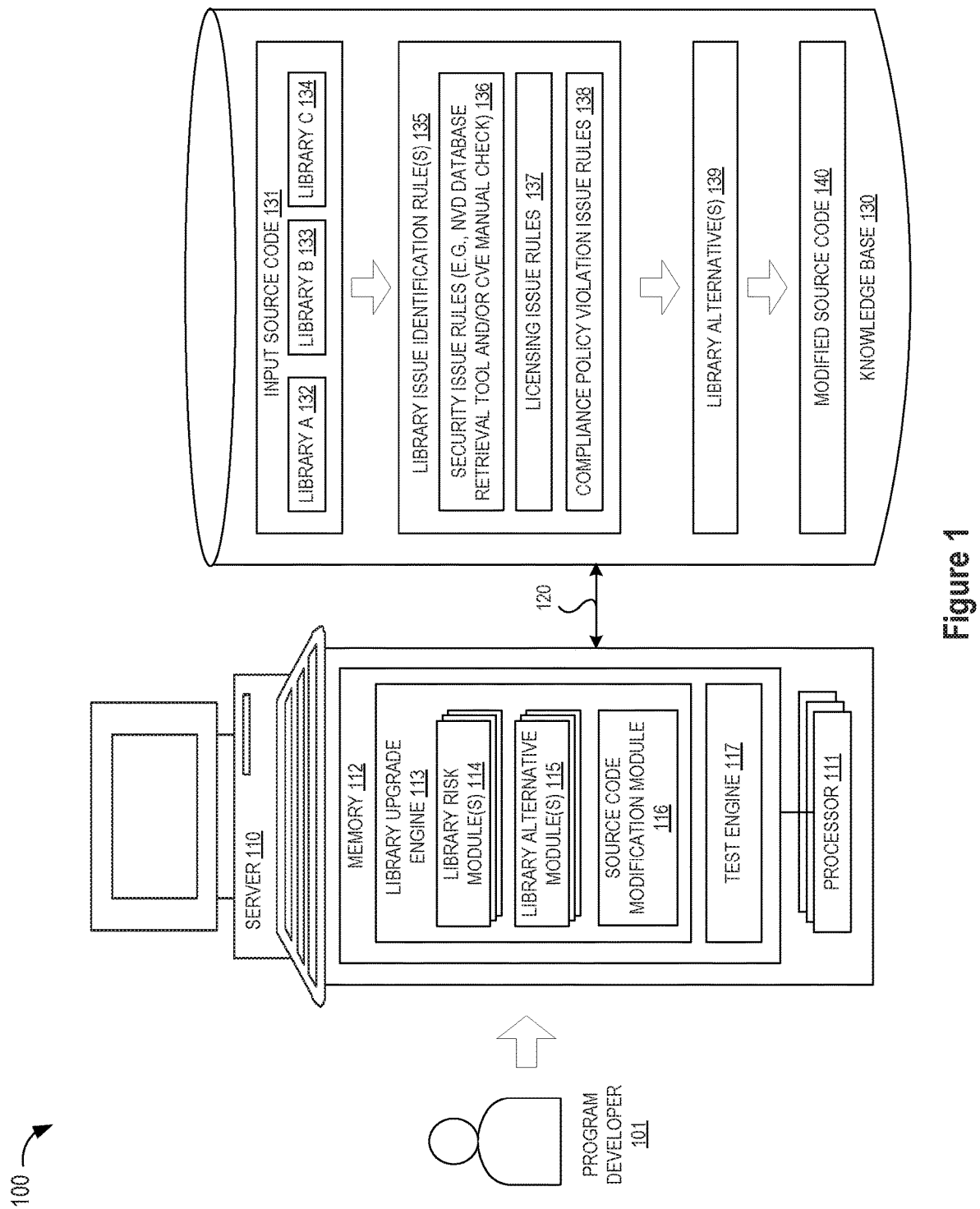
FIG. 1 is a simplified block diagram of a data processing system for identifying and generating library alternative upgrade recommendations in accordance with selected embodiments of the present disclosure.

A library alternative upgrade recommendation engine, methodology, and apparatus are described for efficiently improving code reuse and improving codebase maintainability by automatically assessing source code libraries against specified library identification metrics to identify problematic libraries having specified performance issues (such as security vulnerability issues, license constraint issues, compliance policy issues, or the like) to identify and recommend an alternative library for substitution with the problematic libraries and automatically modifying the source code to include the alternative library in a suggestion and/or upgrade to resolve the specified performance issues. In disclosing the library alternative upgrade recommendation engine, methodology, and apparatus for identifying alternative libraries for substitution with problematic libraries by using specific rules, rather than humans, to provide an automated sequence for identifying problematic libraries, recommending alternative library substitutions, and automatically modifying the source code to substitute the alternative library for the problematic library, there is disclosed an improvement in computer-related technology that uses a combined order of specific rules that renders information into a specific format that is then used and applied to create desired results in the form of identified library upgrades for the problematic libraries.

While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Referring now to FIG. 1, a simplified block diagram illustrates an exemplary data processing system 100 for identifying and generating library alternative upgrade recommendations with one or more server/computer systems 110 having processor(s) 111, memory 112, and associated database storage devices 130 which may be connected together over a suitable connection link 120 or network, such as a private wide area network (WAN) or the Internet (not shown). To illustrate the operative functionality of the data processing system 100, the server memory 112 may be used to store the program module functionality for the library upgrade engine 113. As described hereinbelow, the library upgrade engine 113 acts upon the input source code files 131 and/or data from the database storage devices 130 to generate library upgrade recommendations for replacing one or more libraries having specified performance limitations (e.g., Library A 132, Library B 133, Library C 134) from the input source code with alternative libraries which resolve one or more of the specified performance limitations. In selected embodiments, the library risk modules 114 having performance limitations and the corresponding library alternative modules which are identified for upgrade operations may be stored in the memory 112, knowledge base 130, and/or retrieved or downloaded from an external database source or repository. The operation of the library suggestion engine 113 to transform input source code files 131 into library risk modules 114 and to identify library alternative modules 115 for substitution with library risk modules 114 through the automated action of the source code modification module 116 is shown with processing steps 114-116, though it will be appreciated that the underlying data may be stored in the database storage device 130 and/or memory 112.

In selected illustrative embodiments, the server/computer system 110 may include a library upgrade engine 113 and/or test engine 117 that may be embodied as a Question Answering (QA) system to use NLP, machine learning, and/or artificial intelligence processing techniques which are augmented with the mechanisms of the illustrative embodiments described hereafter. In a QA system implementation, the library upgrade engine 113 and/or test engine 117 may be embodied as a computer program stored in memory 112 which uses one or more processors 111 to query a structured or unstructured knowledge or information database 130. In particular, the library upgrade engine 113 may retrieve one or more library issue identification rules 135 from the database 130 for use in evaluating one or more libraries 132-134 in the input source code files 131 to identify therefrom library risk modules 114 which have specified performance limitations (such as security vulnerabilities, license constraints, compliance policy issues, or the like). In addition, the library upgrade engine 113 may retrieve or access one or more library alternatives 139 (e.g., from the database 130 or otherwise) to identify library alternative modules 115 on the basis of resolving the specified performance limitations associated with the library risk modules 114. The library upgrade engine 113 may also be configured to modify the input source code 131 by substituting the library alternative modules 114 for the library risk modules 114, thereby generating modified source code 140. In addition, the test engine 117 may be configured to test the modified source code 140, such as by compiling and building the modified source code, and then running a test suite on the modified source code to determine if an auto-upgrade operation succeeded. The configuring of the library upgrade and testing engines 113, 117 may include providing application specific hardware, firmware, and/or software to implement one or more control logic modules 113-117 or the like to facilitate the performance of the operations and generation of the outputs described herein with regard to the illustrative embodiments. In addition or in the alternative, the configuring of the library upgrade and testing engines 113, 117 may include storing software applications in one or more storage devices and loaded into memory of a computing device, such as server 110, for causing one or more hardware processors (e.g., 111) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

In operation, the library suggestion engine 113 may evaluate the input source code files 131 using the library issue identification rules 135 to identify libraries 132-133 having specified performance limitations, such as security vulnerabilities, license limitations, compliance policy constraints, or unsupported or outdated versions, by applying natural language processing (NLP) techniques to reduce the processing burden for identifying source code libraries which have the specified performance limitations. To this end, the library suggestion engine 113 may be provided with a library security risk module 114 which uses security issue rules 136 to access a database of libraries having known security risks. The library security risk module 114 may embody an Open Web Application Security Project (OWASP) dependency check tool utility that identifies project dependencies listed in a national vulnerability database (NVD) and checks if there are any known, publicly disclosed, vulnerabilities. Currently, Java and .NET are supported with the OWASP utility, but additional experimental support has been added (e.g., for Ruby, Node.js, Python) along with limited support for C/C++ build systems (autoconf and cmake). In addition or in the alternative, the library security risk module 114 may access a web interface to a CVE vulnerability data base to check for security vulnerabilities, exploits, metasploit modules, vulnerability statistics and list of versions, and the like.

In addition to identifying libraries with security vulnerabilities, the library suggestion engine 113 may be provided with a library license risk module 114 which uses licensing issue rules 137 to access a database or list of licenses which are identified as suitable (or not suitable) for an organization or product. In selected embodiments, the library license risk module 114 may provide a preconfigured list of licenses that are separated into categories which the user may choose, or the user may define the user's own custom license policies. For example, a commercial organization may implement a license policy whereby open source libraries or libraries from a commercial competitor are not to be used due to legal implications presented by such libraries.

The library suggestion engine 113 may also be provided with a library policy risk module 114 which uses a compliance policy violation issue rules 137 to access a database or list of compliance policy requirements which can prevent or force use of specified libraries or library versions. In selected embodiments, the library policy risk module 114 may provide a categorized list of libraries for an organization or product, including a blacklist policy list of libraries or library versions that may not be used, and a recommended policy list which enforces usage of only certain approved libraries or library versions from a category of libraries that offer similar functionality. The library suggestion engine 113 may also be provided with a library status risk module 114 which categorizes libraries based on specified status metrics, such as a library (version) age metric (e.g., release date), library (version) popularity metric, and/or current support status metric.

Using the library alternative module(s) 115 in the library suggestion engine 113, the problematic libraries 132-134 having specified performance limitations are evaluated against a repository of libraries to identify library alternatives 139 which resolve the specified performance limitations. To this end, one or more library alternative modules 115 may be used to access a centralized directory or database (e.g., Maven repository) of all project jars, library jars, plugins or any other project specific artifacts in order to find a suitable library alternative which resolves the performance limitations. For example, the library alternative module(s) 115 may search a centralized repository of libraries to automatically identify an alternative library that removes or minimizes the security vulnerabilities, license constraints, compliance policy issues, and the like.

Once a suitable alternative library 139 is identified, the library upgrade engine 113 may modify the input the source code 131 to replace each problematic library 132-134 with its corresponding alternative library 139. In particular, a source code modification module 116 may automatically process each problematic library (e.g., Library A 132) to find all references in the input source code 131 to the problematic library, and to make changes to the input source code at each location or place where the problematic library and its version is specified, thereby substituting the problematic library with a corresponding alternative library which resolves the performance issues for the problematic library. In the course of modifying the input source code, the library upgrade engine 113 may present library auto-upgrade recommendations to the program developer with suggestions for swapping an alternative library for a problematic library.

In selected embodiments, the library auto-upgrade recommendations may be presented in a user interface display screen having a summary page or tab which includes a third party library analysis pane (providing summary information about the libraries detected in the input source code) and an auto upgrade recommendation pane (providing summary information about the library auto upgrade results). The user interface display screen may also include a "security vulnerabilities" page or tab which includes or displays information about the libraries detected in the input source code which have security risks along with library upgrade recommendations and auto-upgrade status information for each problematic library, where the displayed library security vulnerability information may specify the name and/or number of libraries having a high security risk, medium security risk, and low security risk. In addition, the user interface display screen may include a "license risks" page or tab which includes or displays information about the libraries detected in the input source code which have license risks, where the displayed library license risk information may specify the number of high risk libraries and the total number of licenses used. Finally, the user interface display screen may also include a "policy violations" page or tab which includes or displays information about the libraries detected in the input source code which have compliance policy risks, where the displayed library policy violations information may specify the total number of violated policies, the number of blacklisted policies used, and the number of non-recommended libraries used.

In the third party library analysis pane of the user interface display screen, summary information may be provided to indicate the overall number and/or name of detected problematic libraries that have performance issues, alone or in combination with summary information indicating the number of libraries having security vulnerability issues, the number of libraries having compliance policy violation issues, and the number of libraries having license risk issues. For example, the summary information in the third party library analysis pane may specify that 57 libraries were detected in the input source code, with 12 libraries having high security risks, 11 libraries having compliance policy violations, and 3 libraries having license risks.

In the auto upgrade recommendation pane of the user interface display screen, summary information may be provided to indicate the number and/or name of libraries where alternative libraries have been identified for possible upgrade of a problematic library, alone or in combination with summary information indicating the number of libraries that are ready for upgrade and/or the number of library upgrade failures and the reasons therefore. For example, the summary information in the auto upgrade recommendation pane may specify that 7 libraries are ready for upgrade, 5 libraries could not be upgraded due to unit test failures, 3 libraries could not be upgraded due to build errors, and 8 libraries could not be upgraded due to insufficient tests.

As will be appreciated, once the server/computer system 110 is configured to implement the library upgrade and testing engines 113, 117, the server/computer system 110 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the automatic identification libraries having performance risks and automatic substitution of suitable alternative libraries which resolve the performance risks through source code modification processing which finds all source code references to a problematic library and make changes at places where the problematic library and its version is specified, thereby suggesting a better alternative to a problematic library being used in the source code and providing a facility to automatically upgrade or modify the source code with a suitable alternative library.

Figure 2:
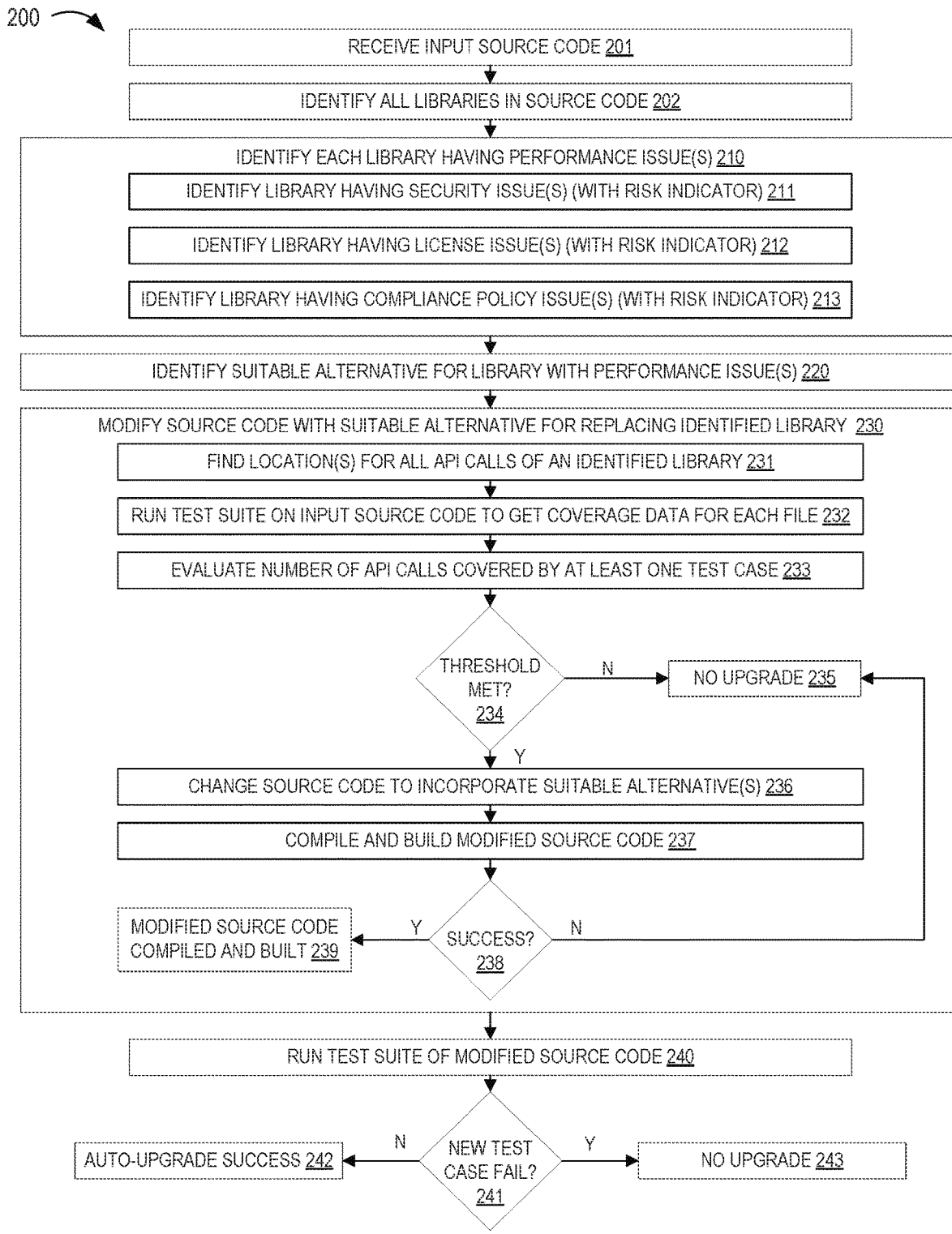
FIG. 2 illustrates a simplified flow chart showing the logic for automatically identifying and generating library alternative upgrade recommendations in accordance selected embodiments of the present disclosure.

To provide a contextual understanding for selected embodiments of the present disclosure, reference is now made to FIG. 2 which illustrates a simplified library upgrade workflow 200 showing the logic and/or processing steps for automatically identifying and generating library alternative upgrades for source code libraries having performance issues in accordance selected embodiments of the present disclosure. In selected embodiments, the depicted library upgrade workflow 200 may be implemented in whole or in part with a data processing system (such as shown in FIG. 1) and/or a single integrated circuit (e.g., a system-on-chip) or a plurality of integrated circuits to implement one or more processors with local memory and database storage that are interconnected and interoperate using any suitable technique without departing from the present invention. However implemented, the library upgrade workflow 200 receives input source code (block 201) having one or more libraries (e.g., Libraries A-C in FIG. 1) which may be checked into the system as source code and binary files created by the program developer.

Upon check-in to the library upgrade workflow 200, the input source code is automatically assessed (at block 202) by applying one or more code analysis tools to determine what libraries are included in the source code. While any suitable code assessment technique may be used, selected embodiments may employ NLP and/or machine learning processing to identify libraries in the input source code.

Once the source code libraries are identified, each library is automatically evaluated to identify libraries having performance issues (at block 210). While any suitable code evaluation technique may be used, selected embodiments may employ NLP and/or machine learning to determine if a given library has security vulnerability issues. For example, the library issue evaluation process (block 210) may identify a library having security issues (step 211) by accessing a list or repository of security vulnerabilities affecting a specific library that may be accessed at repository of security vulnerabilities, such as the National Vulnerability Database (NVD) (https://nvd.nist.gov/), Common Vulnerabilities and Exposures (CVE) system (http://www.cvedetails.com/), or the like. For example, the NVD repository may be automatically accessed using the OWASP dependency check tool (https://www owasp.org/index.php/OWASP_Dependency_Check) to determine if a library has a security vulnerability risk. The security issue identification processing at step 211 may include obtaining a security risk indication (e.g., high risk, medium risk, low risk) for each affected library.

In addition or in the alternative, the library issue evaluation process (block 210) may identify a library having license issues (step 212) by accessing a preconfigured list of licenses which identifies licenses that are not suitable for use by certain organizations or products due to legal implications. In selected embodiments, the preconfigured list of licenses accessed at step 212 may be separated into different categories which the user can choose from, or the user can define custom policies. The license issue identification processing at step 212 may include obtaining a license risk indication (e.g., high risk, medium risk, low risk) for each affected library.

In addition or in the alternative, the library issue evaluation process (block 210) may identify a library having specified compliance policy issues (step 213) by accessing a database or list of compliance policy requirements which can prevent or force use of specified libraries or library versions. In selected embodiments, the library policy risk list accessed at step 213 may be separated into different categories, including a blacklist policy list of libraries or library versions that may not be used, and a recommended policy list which enforces usage of only certain approved libraries or library versions from a category of libraries that offer similar functionality. The license compliance policy issue identification processing at step 213 may categorize libraries in terms of specified compliance policy metrics, such as a library (version) age metric, library (version) popularity metric, and/or current support status metric. As disclosed herein, the age metric may specify a release date which should be met by a library or version. In addition, the popularity metric may specify a minimum or relative percent or rank based on usage amongst the list of libraries in its category offering similar functionality and/or relative percent/rank amongst different versions of the same library. In addition, the support status metric may specify whether the library is being actively developed or supported by the community. In addition, the license compliance policy issue identification processing at step 213 may include obtaining a license risk indication (e.g., blacklisted libraries, non-recommended libraries) for each affected library.

Once the source code libraries having performance issues are identified as problematic libraries (block 210), each identified problematic library is automatically evaluated to identify a suitable alternative library that may be used to upgrade or replace the problematic library (at block 220). While any suitable library evaluation technique may be used, selected embodiments may employ NLP and/or machine learning to find a suitable alternative which eliminates or reduces the performance issue(s) for the problematic library. For example, one or more library alternative modules may be used to access a centralized directory or database (e.g., Maven repository) of all project jars, library jars, plugins or any other project specific artifacts in order to find a suitable library alternative which resolves the performance limitations. In selected embodiments, the library alternative module may search a centralized repository of libraries to automatically identify an alternative library (e.g., an updated or current version of the problematic library) that removes or minimizes the security vulnerabilities, license constraints, compliance policy issues, and the like. While the processing at step 220 to identify a suitable alternative may use a more current or updated version of the problematic library from the Maven repository database as a suitable alternative library, it will be appreciated that other techniques may be used to identify suitable alternatives, including but not limited to creating new alternative library solutions (e.g., substituting a new, separate library having similar functionality for the problematic library). For example, a library matching database may be provided which lists matching libraries having similar functionality for use in identifying suitable alternative libraries.

Once the suitable alternative libraries are identified (block 220), the input source code may be automatically modified (at block 230) to replace the problematic library with the suitable alternative library. While any suitable source code modification technique may be used, selected embodiments may employ artificial intelligence processing techniques, such as NLP and/or machine learning, to automatically upgrade the input source code to replace each problematic library with a suitable alternative library and check if the modified/upgraded source code runs without any issues. In a first source code modification step, the source code is evaluated at step 231 to find all the API calls of the problematic library and their location in the input source code. Next, the test suite of all test cases in the input source code is run to get the line coverage details for each source code file at step 232. Using the coverage data obtained from step 232, the process evaluates the number of API calls that are covered by at least one test case (step 233) and then determines (step 234) if the test case coverage for library calls meets a configurable threshold coverage requirement (e.g., 80%) which may be adjusted as needed. If the test case coverage for library calls is below the configurable minimum threshold (negative outcome to threshold detection step 234), then the auto-upgrade is marked unsuccessful and the source code modification process stops (step 235). However, if the test case coverage for library calls meets the configurable minimum threshold (affirmative outcome to threshold detection step 234), then the source code modification process continues (at step 236) to change the source code to incorporate the suitable alternative libraries (from block 220) in substitution for the problematic libraries (from block 210). For example, the change may be implemented by changing the version number information for a library to a current or updated version of the library based on information obtained from the Maven repository. After modifying the source code, the source code is compiled and built (step 237). If either of these steps 236, 237 fails (negative outcome to success detection step 238), then the auto-upgrade is marked unsuccessful and the source code modification process stops (step 235). However, if the source code is successfully changed, (affirmative outcome to success detection step 238), then the modified source code (step 239) is ready for testing.

To test the modified source code, a test suite is run (block 240) to determine if the modified source code can be used in place of the original input source code. While any suitable source code test techniques may be used, selected embodiments may employ artificial intelligence processing techniques, such as NLP and/or machine learning, to automatically test the modified source code by running the test suite cases to determine if any new test case has failed after the library upgrade. For example, if the original input source code has 100 test cases with only 90 test cases passing, then test processing at step 240 assesses the modified source code to determine whether the 90 passing test cases still pass. If there are any new test case failures (affirmative outcome to detection step 241), then the auto-upgrade is marked unsuccessful (block 243), the failed test cases are marked as "Require developer Review," and the library upgrade workflow ends. However, if there are no new test case failures (negative outcome to detection step 241), then the auto-upgrade is marked successful (block 242).

To provide additional details for an improved understanding of selected embodiments of the present disclosure, reference is now made to FIG. 3 which depicts an example screen shot of a user interface 300 for a library alternative upgrade recommendation engine that automatically identifies and generates library alternative upgrade recommendations in accordance selected embodiments of the present disclosure. In the depicted screen shot of user interface 300, there is a "Summary" page or tab 302, a "Security Vulnerabilities" page or tab 303, a "License Risks" page or tab 304, a "Policy Violations" page or tab 305, a "Library Age Metrics" page or tab 306, and an "Open Source Popularity" page or tab 307, each providing topic specific details about the library upgrade workflow and results. For example, the "Summary" page or tab 302 may provide summary information with an "Auto-Upgrade Recommendations" pane 310 (providing summary information 311-312 about the library auto upgrade results) and a "Third Party Library Analysis" pane 320 (providing summary information 321-326 about the libraries detected in the input source code).

Generally speaking, the "Third Party Library Analysis" pane 320 shows summary information on the total libraries found in the project, and the "Auto-Upgrade Recommendations" pane 310 shows the auto-upgrade results. In this example, the "Third Party Library Analysis" pane 320 shows a first "Libraries with Issues" summary field 321 identifying the number and type of library issues, a second "Library Age" field 322 providing age data for the detected libraries, and a third "Open Source Popularity" field 323 providing popularity data for the detected libraries. In selected embodiments, the "Third Party Library Analysis" pane 320 may also include a "Library Security" field 324 providing quantitative risk indicators for the identified vulnerable libraries, a "Policy Violations" field 325 providing quantitative risk indicators for the number and severity of policy violations, and a "License Risk" field 326 providing quantitative risk indicators for the number of licenses used in high risk libraries.

With respect to the subset of project libraries that are candidates for automatic upgrade, the "Auto-Upgrade Recommendations" pane 310 displays a first "Library Auto-Upgrade Results" summary field 311 identifying the auto-upgrade results for the alternative libraries identified for possible upgrade of a problematic library. For example, the summary field 311 may specify that 7 libraries are ready for upgrade, 5 libraries could not be upgraded due to unit test failures, 3 libraries could not be upgraded due to build errors, and 8 libraries could not be upgraded due to insufficient tests. In addition, the "Auto-Upgrade Recommendations" pane 310 may include a "Top Auto-Upgrade Ready Recommendations" field 312 identifying the readily applied or recommended library upgrades by name with version upgrade information. For example, the field 312 may specify that the "Apache HT Client" library is recommended to be upgraded from version 4.3.6 to version 4.4.

By using the cursor 301 or other user interface controls to interact with the user interface 300, the developer may cause the library upgrade engine to display additional user interface screens which provide additional details about the security vulnerabilities, license risks, policy violations, library age metrics, open source popularity, and the like. For example, by clicking the "Security Vulnerabilities" page or tab 303, a user interface screen may be opened which provides additional details about the identified source code libraries having security vulnerabilities, where each vulnerable library may be identified by name, along with indications about the number of type of detected security vulnerabilities, the recommended library version upgrade, and the current auto-upgrade status (e.g., "ready for upgrade," under "review" due to insufficient test coverage, or "failure" due to unit test failure). Through additional user interface interaction, the library upgrade engine may display additional user interface screens providing additional details about the security vulnerabilities affecting problematic libraries, such as information identifying the security vulnerability (e.g., a CVE ID) with an accompanying Common Vulnerability Scoring System Score (CVSS) score, Common Weakness Enumeration (CWE), and description of the security vulnerability. In addition, the library upgrade engine may display one or more additional user interface screens providing additional details about the auto-upgrade status for specific problematic libraries, including information identifying the unit test coverage results in terms of the usages or locations of the library which were successfully tested or untested (e.g., 9 tested locations and 1 untested locations), along with information identifying any newly failed unit tests. If there any new failed unit tests, the user interface screen(s) may indicate an auto-upgrade failure by displaying the unit test coverage results in terms of the unit test status results with an indication of the reason for the failure (e.g., "build failure" or "compile failure" or "insufficient tests").

Figure 4:
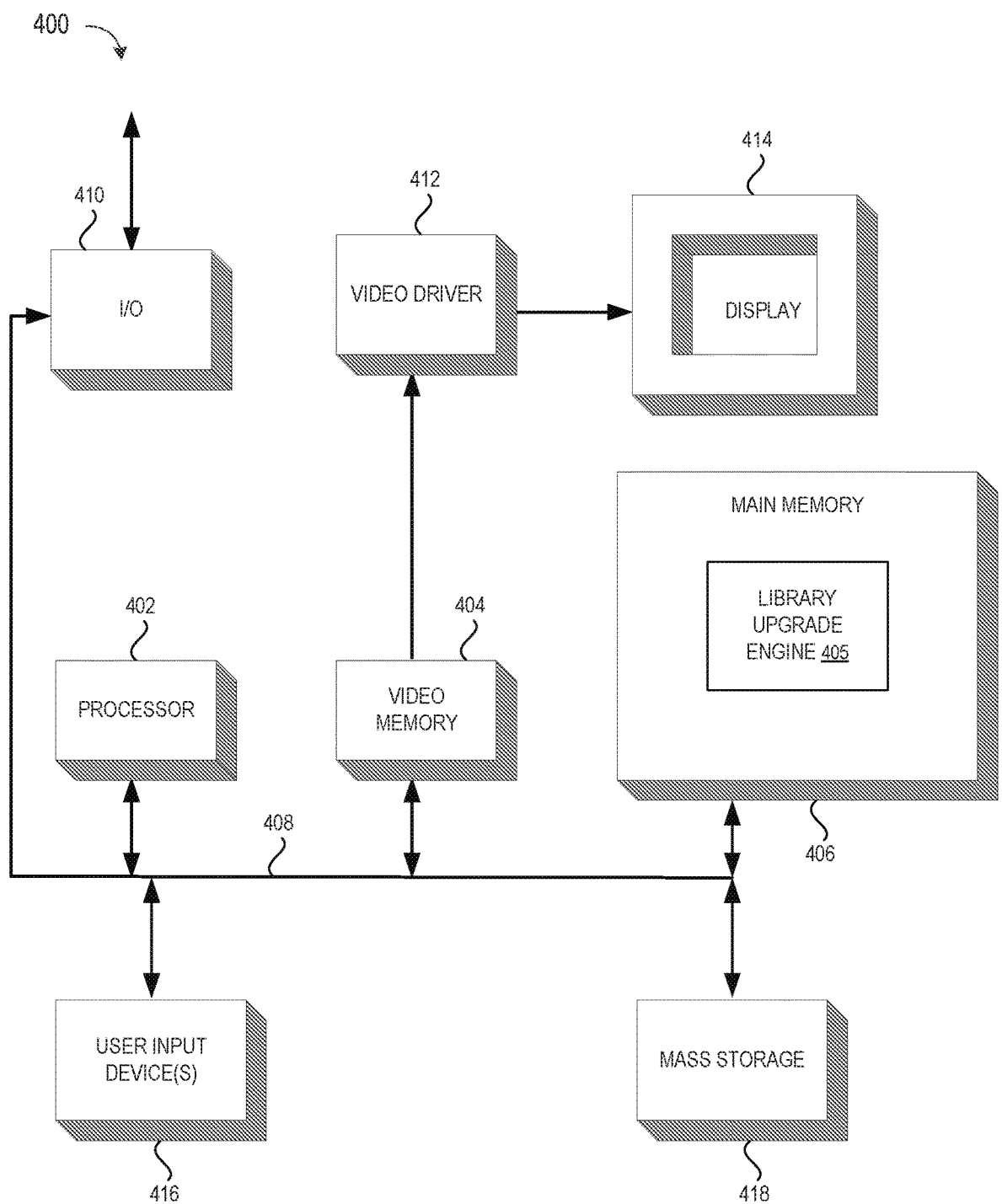
FIG. 4 is a simplified block diagram of a general-purpose computer in accordance with selected embodiments of the present disclosure.

Embodiments of the system and method for identifying and upgrading source code libraries can be implemented on a computer system, such as a general-purpose computer 400 illustrated in FIG. 4. As disclosed the computer 400 includes input user device(s) 416, such as a keyboard and/or mouse, which are coupled to a bi-directional system bus 408. The input user device(s) 416 are used for introducing user input to the computer system 400 and communicating that user input to processor 402. The computer system 400 may also include a video memory 404, main memory 406, and mass storage 418, all coupled to bi-directional system bus 408 along with input user device(s) 416 and processor 402. The mass storage 418 may include both fixed and removable media, such as other available mass storage technology. Bus 408 may contain, for example, 32 address lines for addressing video memory 404 or main memory 406. The system bus 408 may also include, for example, an n-bit data bus for transferring data between and among the components, such as CPU 402, main memory 406, video memory 414, and mass storage 418, where "n" is, for example, 32 or 64. Alternatively, multiplex data/address lines may be used instead of separate data and address lines.

The computer 400 may also include I/O device(s) 410 which provide connections to peripheral devices, such as a printer, and may also provide a direct connection to remote server computer systems via a telephone link or to the Internet via an ISP. I/O device(s) 410 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 418 until loaded into main memory 406 for execution. Computer programs may also be in the form of electronic signals modulated in accordance with the computer program and data communication technology when transferred via a network. The method and functions relating to system and method for automatically upgrading source code libraries that may be implemented in a computer program for a library upgrade engine 405.

The processor 402, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 406 is comprised of dynamic random access memory (DRAM). Video memory 404 is a dual-ported video random access memory. One port of the video memory 404 is coupled to video amplifier or driver 412. The video amplifier 412 is used to drive the display 414. Video amplifier 412 is well known in the art and may be implemented by any suitable means. This circuitry converts pixel data stored in video memory 404 to a raster signal suitable for use by display 414. Display 414 is a type of monitor suitable for displaying graphic images.

By now, it will be appreciated that there is disclosed herein a system, method, apparatus, and computer program product for enhancing operable functionality of a source code program by performing a method at a device having a processor and a memory. As disclosed, the system, method, apparatus, and computer program receive a source code program submitted by a developer, such as by committing, to a library upgrade engine, source code and binary files. Subsequently, one or more libraries in the source code program are identified and evaluated for a plurality of predetermined selection criteria specifying library performance limitations to identify at least a first library which does not meet the plurality of predetermined selection criteria. In selected embodiments, the predetermined selection criteria includes a library age criterion, library popularity criterion, and current support status criterion. In other embodiments, each of the one or more libraries is evaluated for a security vulnerability selection criteria specifying a library security vulnerability that is published in a database repository. In other embodiments, each of the one or more libraries is evaluated for a license risk selection criteria specifying a library license risk for an organization or product. In other embodiments, each of the one or more libraries is evaluated for a compliance policy selection criteria specifying a library compliance policy requirement for an organization or product. Using the first library, at least a first alternative library is identified that is suitable for substitution for the first library. In selected embodiments, the first alternative library is identified as a current or updated version of the first library that meets the plurality of predetermined selection criteria. Once the first alternative library is identified, the source code program is automatically modified to replace the first library with the first alternative library, thereby generating a modified source code program having an upgraded library functionality. In selected embodiments, the source code program modification process includes finding all API call references to the first library in the source code program; running a test suite on the source code program to get coverage data for each file in the source code program; determining if there are a minimum number of API call references to at least one test case in the first library; replacing the first library in the source code program with the first alternative library to generate a modified source code program if the minimum number of API call references is met; and compiling and building the modified source code program.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically detect and implement library upgrade opportunities, improve the quality and robustness of software, educate developers about library upgrade opportunities and implementations, and generate more readable, reliable, smaller, and robust code with less effort. The local or database memory used for storing firmware or hardware modules in accordance with selected embodiments of the present disclosure may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present disclosure may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present disclosure may take the form of computer program product embodied in a computer readable storage medium or media having computer readable program instructions thereon for causing a processor to carry out aspects of the present disclosure. Thus embodied, the disclosed system, a method, and/or a computer program product is operative to improve the design, functionality and performance of software programs by automatically detecting and recommending library upgrade substitutions for replacing problematic libraries in the software program.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for generating library upgrades may be implemented in any type of computer system or programming or processing environment. It is contemplated that the system and method for generating library upgrade recommendations might be run on a stand-alone computer system, such as the one described above. The system and method for generating library upgrades might also be run from a server computer systems system that can be accessed by a plurality of client computer systems interconnected over an intranet network. Finally, the system and method for generating library upgrades may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed by a device having a processor and memory for enhancing operable functionality of a source code program, comprising:
   receiving, by the device, a source code program submitted by a developer;
   identifying, by the device, one or more libraries in the source code program;
   evaluating, by the device, each of the one or more libraries for a plurality of predetermined selection criteria specifying library performance limitations to identify at least a first library which does not meet the plurality of predetermined selection criteria;
   identifying, by the device, at least a first alternative library that is suitable for substitution for the first library; and
   automatically modifying the source code program to replace the first library with the first alternative library, thereby generating a modified source code program having an upgraded library functionality;
   wherein automatically modifying the source code program comprises:
      finding all API call references to the first library in the source code program;
      running a test suite on the source code program to get coverage data for each file in the source code program;
      determining if there are a minimum number of API call references to at least one test case in the first library;
      replacing the first library in the source code program with the first alternative library to generate a modified source code program if the minimum number of API call references is met; and
      compiling and building the modified source code program.

2. The method of claim 1, where receiving the source code program comprises committing to a library upgrade engine source code and binary files.

3. The method of claim 1, where evaluating each of the one or more libraries comprises evaluating, by the device, each of the one or more libraries for a security vulnerability selection criteria specifying a library security vulnerability that is published in a database repository.

4. The method of claim 1, where evaluating each of the one or more libraries comprises evaluating, by the device, each of the one or more libraries for a license risk selection criteria specifying a library license risk for an organization or product.

5. The method of claim 1, where evaluating each of the one or more libraries comprises evaluating, by the device, each of the one or more libraries for a compliance policy selection criteria specifying a library compliance policy requirement for an organization or product.

6. The method of claim 1, where identifying a first alternative library comprises identifying a current or updated version of the first library as the first alternative library that meets the plurality of predetermined selection criteria.

7. The method of claim 1, where the plurality of predetermined selection criteria comprises a library age criterion, library popularity criterion, and current support status criterion.

8. A non-transitory, computer program product comprising at least one recordable medium having stored thereon executable instructions and data which, when executed by at least one processing device, cause the at least one processing device to enhance operable functionality of a source code program by:
receiving a source code program submitted by a developer;
identifying one or more libraries in the source code program;
evaluating each of the one or more libraries for a plurality of predetermined selection criteria specifying library performance limitations to identify at least a first library which does not meet the plurality of predetermined selection criteria;
identifying at least a first alternative library that is suitable for substitution for the first library; and
automatically modifying the source code program to replace the first library with the first alternative library, thereby generating a modified source code program having an upgraded library functionality;
wherein automatically modifying the source code program comprises:
finding all API call references to the first library in the source code program;
running a test suite on the source code program to get coverage data for each file in the source code program;
determining if there are a minimum number of API call references to at least one test case in the first library;
replacing the first library in the source code program with the first alternative library to generate a modified source code program if the minimum number of API call references is met; and
compiling and building the modified source code program.

9. The non-transitory, computer program product of claim 8, wherein the computer readable program, when executed on the system, causes the at least one processing device to evaluate each of the one or more libraries by evaluating each of the one or more libraries for a security vulnerability selection criteria specifying a library security vulnerability that is published in a database repository.

10. The non-transitory, computer program product of claim 8, wherein the computer readable program, when executed on the system, causes tire at least one processing device to evaluate each of the one or more libraries by evaluating each of the one or more libraries for a license risk selection criteria specifying a library license risk for an organization or product.

11. The non-transitory, computer program product of claim 8, wherein the computer readable program, when executed on the system, causes the at least one processing device to evaluate each of the one or more libraries by each of the one or more libraries for a compliance policy selection criteria specifying a library compliance policy requirement for an organization or product.

12. The non-transitory, computer program product of claim 8, wherein the computer readable program, when executed on the system, causes the at least one processing device to identify a first alternative library by identifying a current or updated version of the first library as the first alternative library that meets the plurality of predetermined selection criteria.

13. The non-transitory, computer program product of claim 8, where the plurality of predetermined selection criteria comprises a library age criterion, library popularity criterion, and current support status criterion.

14. A system comprising:
one or more processors;
a memory coupled to at least one of the processors; and
a set of instructions stored in the memory and executed by at least one of the processors to enhance operable functionality of a software program, wherein the set of instructions are executable to perform actions of:
receiving a source code program submitted by a developer;
identifying one or more libraries in the source code program;
evaluating each of the one or more libraries for a plurality of predetermined selection criteria specifying library performance limitations to identify at least a first library which does not meet the plurality of predetermined selection criteria;
identifying at least a first alternative library- that is suitable for substitution for the first library, and
automatically modifying the source code program to replace the first library with the first alternative library, thereby generating a modified source code program having an upgraded library functionality;
wherein automatically modifying the source code program comprises:
finding all API call references to the first library in the source code program;
running a test suite on the source code program to get coverage data for each file in the source code program;
determining if there are a minimum number of API call references to at least one test case in the first library;
replacing the first library in the source code program with the first alternative library to generate a modified source code program if the minimum number of API call references is met; and
compiling and building the modified source code program.

15. The system of claim 14, where evaluating each of the one or more libraries evaluating for a security vulnerability selection criteria specifying a library security vulnerability that is published in a database repository, for a license risk selection criteria specifying a library license risk for an organization or product, or for a compliance policy selection criteria specifying a library compliance policy requirement for an organization or product.

16. The system of claim 14, where identifying a first alternative library comprises identifying a current or updated version of the first library as the first alternative library that meets the plurality of predetermined selection criteria.

17. The system of claim 14, where the plurality of predetermined selection criteria comprises a library age criterion, library popularity criterion, and current support status criterion.

\* \* \* \* \*